Figure 8:
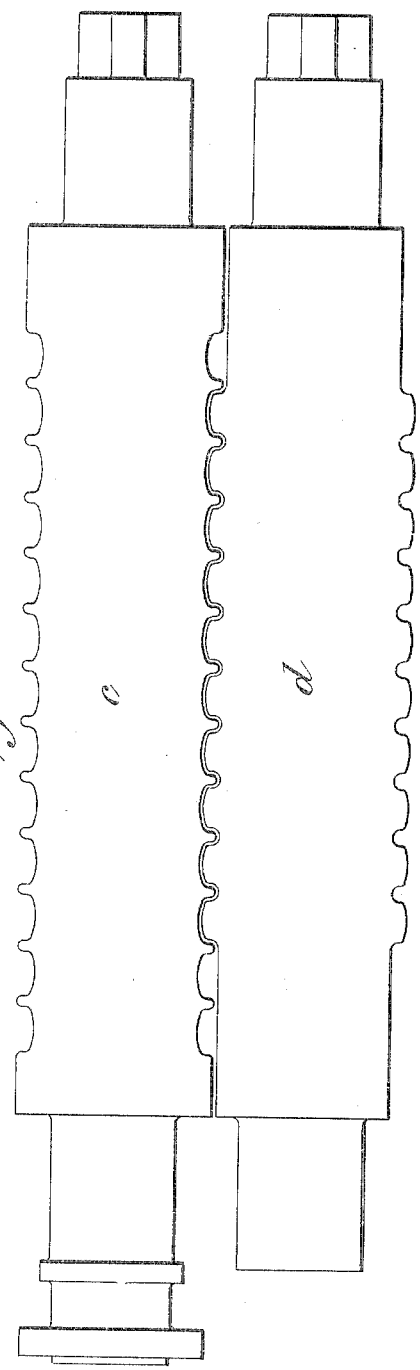
Figure 9:
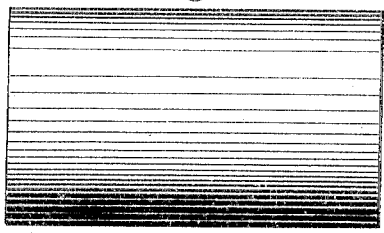
Figure 10:
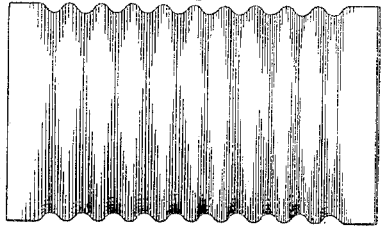
Figure 11:
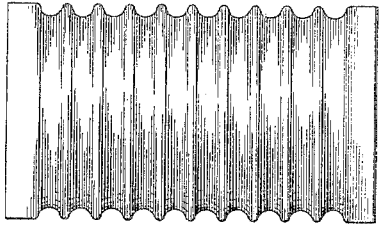
Figure 12:
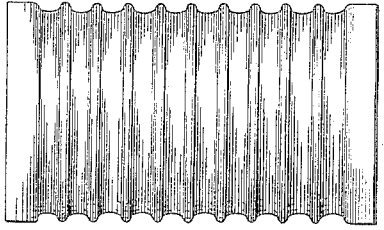

No. 794,089. PATENTED JULY 4, 1905.
E. GEARING & W. RAINFORTH.
MANUFACTURE OF STEAM BOILER FURNACES AND FLUES.
APPLICATION FILED FEB. 16, 1904.
5 SHEETS—SHEET 1.
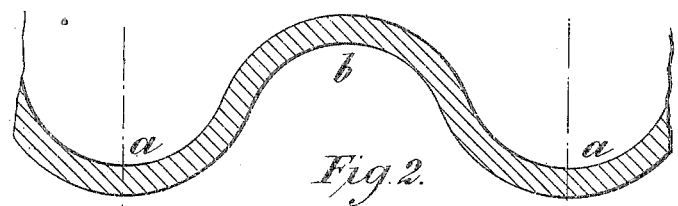
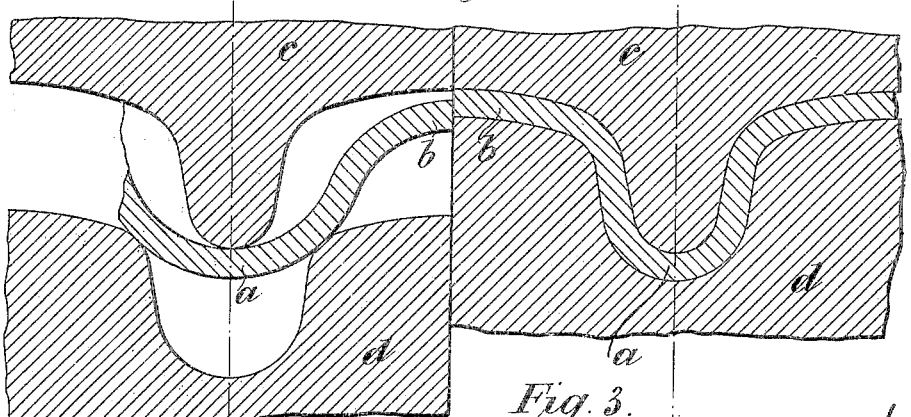
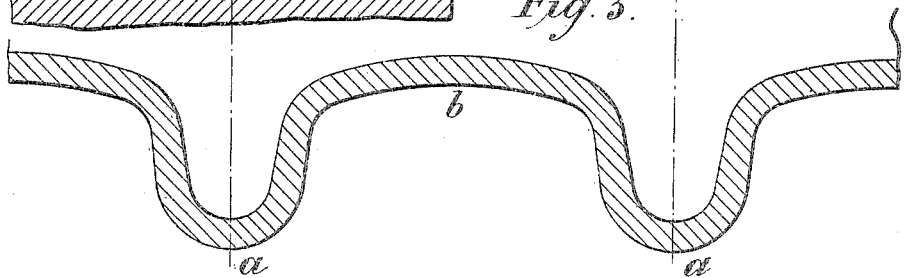

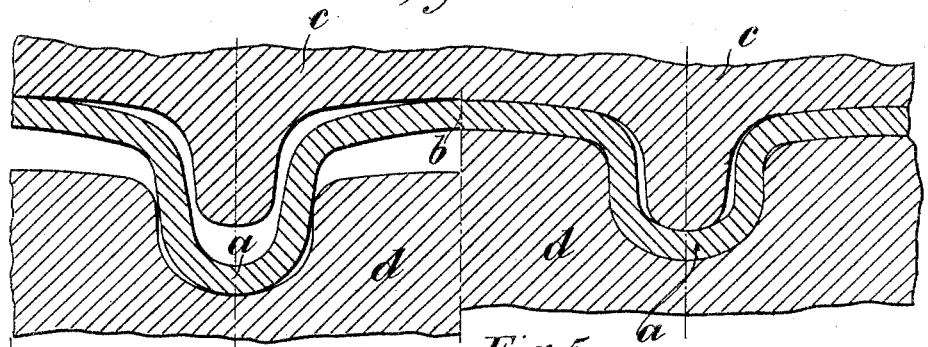
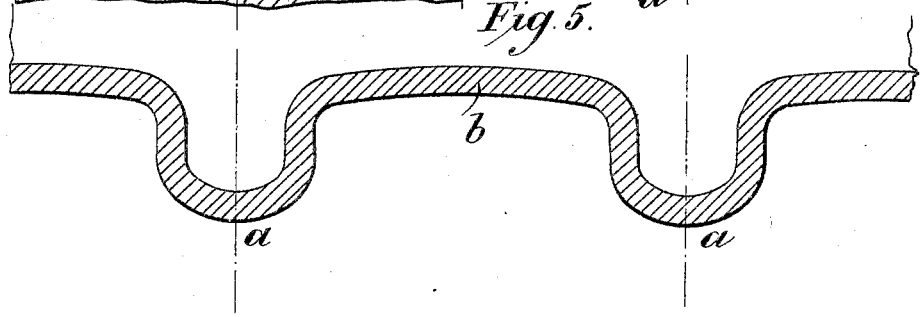

No. 794,089. PATENTED JULY 4, 1905.
E. GEARING & W. RAINFORTH.
MANUFACTURE OF STEAM BOILER FURNACES AND FLUES.
APPLICATION FILED FEB. 16, 1904.
5 SHEETS—SHEET 3.
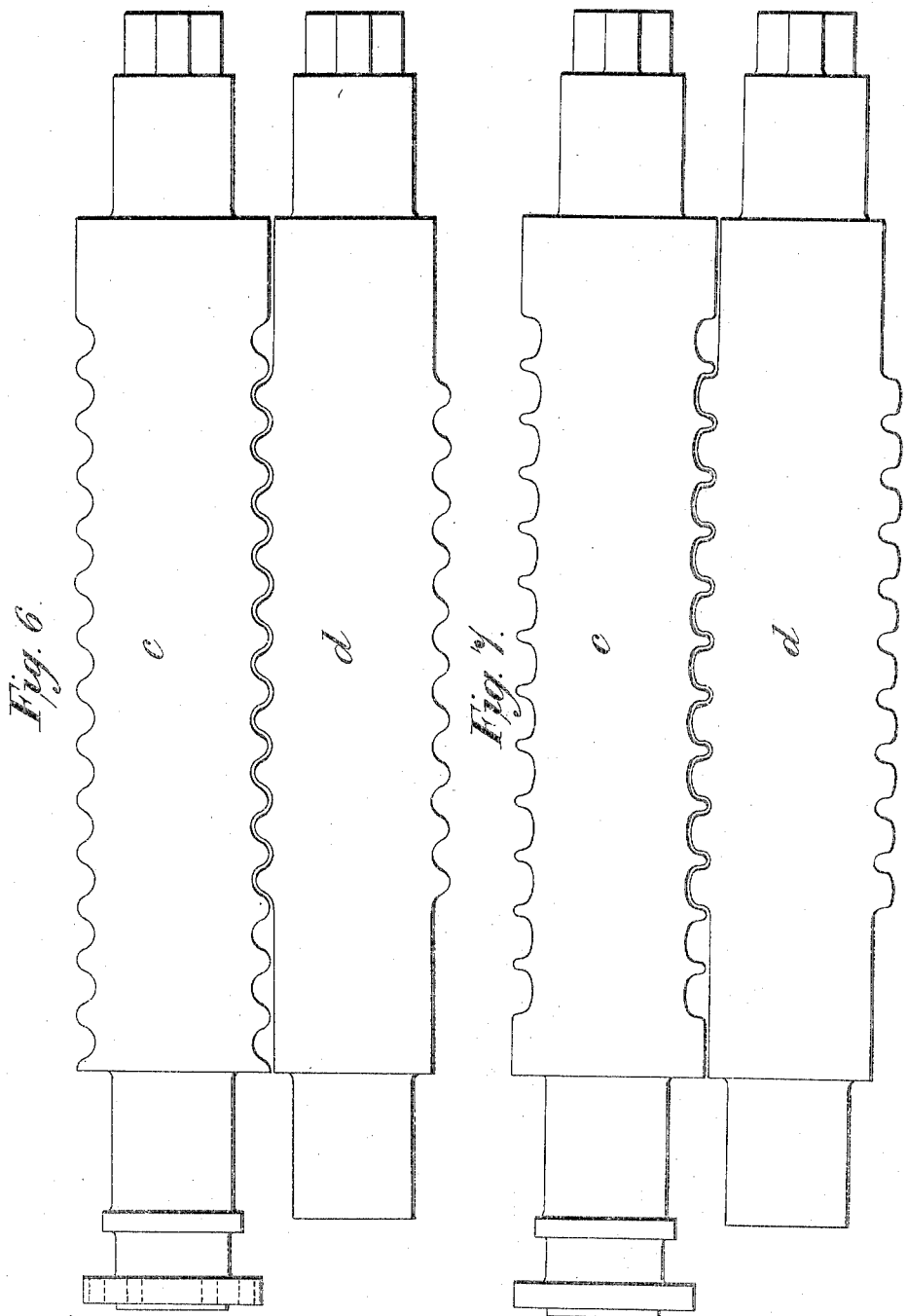

No. 794,089. PATENTED JULY 4, 1905.
E. GEARING & W. RAINFORTH.
MANUFACTURE OF STEAM BOILER FURNACES AND FLUES.
APPLICATION FILED FEB. 16, 1904.

5 SHEETS—SHEET 4.

No. 794,089. PATENTED JULY 4, 1905.
E. GEARING & W. RAINFORTH.
MANUFACTURE OF STEAM BOILER FURNACES AND FLUES.
APPLICATION FILED FEB. 16, 1904.

5 SHEETS—SHEET 5.

No. 794,089. Patented July 4, 1905.

UNITED STATES PATENT OFFICE.

ERNEST GEARING, OF HARROGATE, AND WILLIAM RAINFORTH, OF LEEDS, ENGLAND.

MANUFACTURE OF STEAM-BOILER FURNACES AND FLUES.

SPECIFICATION forming part of Letters Patent No. 794,089, dated July 4, 1905.

Application filed February 16, 1904. Serial No. 193,866.

*To all whom it may concern:*

Be it known that we, ERNEST GEARING, residing at Harrogate, and WILLIAM RAINFORTH, residing at Leeds, in the county of York, England, subjects of the King of Great Britain and Ireland, have invented Improvements in the Manufacture of Steam-Boiler Furnaces and Flues, of which the following is a specification.

It has been found impracticable to roll corrugated steam-boiler furnaces and flues (hereinafter referred to as "furnaces") with steep-sided corrugations or hollow strengthening-ridges of adequate depth to afford the requisite strength to withstand modern working boiler-pressures, because undue thinning of the metal in places is caused when it is attempted to produce by rolling in the ordinary manner a furnace with steep-sided corrugations of unusually great depth. It is believed that for this reason the depth of the corrugations, measured from outside to inside, has not exceeded two to two and one-eighth inches or thereabout.

Now the object of this invention is to enable exceptionally deep and steep-sided hollow strengthening-ridges to be produced by a series of simple rolling operations without unduly thinning any portion of the furnace-wall. For this purpose a plain tube of suitable diameter and thickness has formed in its wall (as seen in a longitudinal section of the tube in a plane containing its axis) outwardly-projecting annular ridges having outwardly-curved tops and intermediate valleys having inwardly-curved bottoms and afterward, while at a suitable temperature, is subjected to the action of internal and external rolls of such contours that the depth of the hollow ridges from their summit to the bottoms of the valleys is decreased. The radius of curvature of the ridges and of the valleys, or the middle portions thereof, can be increased or flattened. The sides of the hollow ridges may be steepened or thickened, or both, during this process of reducing the depth of the ridges, or the thickness of the wall of the resulting furnace may be practically uniform throughout; but sometimes the ridges are thickened by reducing their diameter and the middle portions of the valleys slightly thinned by increasing their diameter, the thickness varying according to the diameter, and thus equalizing the resistance to collapse offered by the various parts of the furnace. The ridges may be thickest at their tops, their sides decreasing gradually in thickness toward the valleys.

Furnaces can be produced according to this invention with the end portions of their walls considerably thicker than the valley portions, which is advantageous, because, as is well known, those portions which as seen in a longitudinal section are flat are usually the weakest. The thickness of the wall of the tube in which the deep steep-sided ridges are to be formed varies according to the depth and form of the corrugations or ridges—that is to say, with ridges of a given pitch the greater the contour the greater the original thickness of the plate.

Referring to the accompanying illustrative drawings, Figure 1 shows a portion of a partially-formed furnace-wall as seen in longitudinal section in a plane containing the axis of the furnace. Fig. 2 is a similar view to Fig. 1, but indicating the application thereto of the rolls, whereby the formation is changed from that shown in Fig. 1 to that shown in Fig. 3. The left-hand and right-hand portions of the figure respectively show the rolls in the positions they occupy at the commencement and end of their operation. Fig. 3 is a similar view to Fig. 1, showing such furnace in a more advanced stage of manufacture; and Fig. 4 is a similar view to Fig. 3, but indicating the application thereto of the rolls, whereby the formation is changed from that shown in Fig. 3 to that shown in Fig. 5. The left and right hand portions of the figure respectively show the rolls at the commencement and end of their operation. Fig. 5 shows an end portion of the furnace-wall in its completed form. Figs. 6, 7, and 8 show in elevation internal and external corrugated rolls adapted to successively impart to the wall of a plain tube the sectional formations illustrated in Figs. 1, 3, and 5, respectively. Figs. 9, 10, 11, and 12 illustrate, respectively, the original plain tube and the same tube after the preliminary corrugating, the same tube after the depth of the ridges has been deepened and their sides steepened, and the completed furnace or flue tube.

In the manufacture of a furnace from a plain tube according to this invention the tube at a suitable temperature is first submitted to a rolling operation between parallel internal and external rolls, which are turned as shown in Fig. 6, so as to stretch the metal more or less equally throughout and form in its wall deep and wide but not steep-sided ridges $a$ and intermediate inwardly-curved valleys $b$, as shown in Fig. 1. The tube thus treated and reheated, if necessary, is then submitted to a further rolling operation, whereby pressure is applied chiefly to the sides of the ridges $a$, so as to steepen them, and thus widen the valleys $b$ without substantially altering the pitch of the ridges, so that the tube-wall will have the sectional form shown in Fig. 3. This further rolling operation may be effected conveniently by internal and external rolls, such as shown in Fig. 7; but in some cases more than one further rolling operation may be necessary to impart to the tube shown in Fig. 1 the formation shown in Fig. 3. A comparison of Figs. 1 and 3 will show that the first operation having stretched the metal more or less equally throughout the succeeding operation practically only changes the position of the material without appreciably stretching it or altering the pitch of the ridges. The thus-formed tube, Fig. 3, is then submitted to a still further operation between internal and external rolls, such as shown in Fig. 8, whereby the depth from the summits of the ridges $a$ to the bottoms of the valleys $b$ is reduced, the tube-wall then having the sectional form shown in Fig. 5. In the example illustrated the first operation formed, by means of an internal roll $c$ and an external roll $d$ of the contours shown in Fig. 6, ridges or outward corrugations $a$ and valleys or inward corrugations $b$ of equal or nearly equal circular curvature. In the second operation the internal and external rolls $c$ and $d$ shown in Fig. 7 so acted on the sides of each ridge $a$ as to cause them to incline toward each other at their outer parts, the radius of curvature of the top of the ridge being reduced and that of the middle portion of each valley being somewhat increased. In the third operation the internal and external rolls $c$ and $d$ shown in Fig. 8 caused the sides of each ridge $a$ to become parallel, and at the same time the radius of the top of each ridge $a$ was increased—for example, in the proportion of, say, about twelve to nineteen—the radius of the bottoms of the valleys being at the same time increased in the proportion of, say, about twenty-seven to sixty-three, while the pitch of the ridges was maintained at, say, eight inches. The depths of the ridges formed by the first operation may be three and one-fourth inches, the second operation increasing the depth to three and one-half inches, and the third operation reducing it to two and one-half inches, or thereabout. A furnace thus formed offers great resistance to collapse by external pressure.

It is to be noted that all the foregoing dimensions are given by way of illustrations and that other dimensions and proportions may be found advantageous in practice.

The several rolling operations may be effected in a mill or mills of ordinary construction, but with internal and external rolls suitably turned to effect the desired result—for example, as shown in Figs. 6, 7, and 8. In some cases two or more rolling operations may be effected between the same pair of rolls, which are then formed at different parts of their length with ribs and corrugations of different contours.

What we claim is—

1. The herein-described process of making by a series of separate rolling operations a steam-boiler furnace of the kind having hollow strengthening-ridges, consisting in stretching the wall of a tube by a first rolling operation and forming outwardly-projecting circumferential ridges and inwardly-projecting circumferential valleys therein and then by a second rolling operation simultaneously increasing the depth of all the ridges and steepening their sides, as set forth.

2. The herein-described process of making by a series of separate and independent rolling operations, a steam-boiler furnace of the kind having hollow strengthening-ridges, consisting in stretching the wall of a tube by a first rolling operation and rolling outwardly-projecting circumferential ridges and inwardly-projecting circumferential valleys therein and then by a second rolling operation increasing the depth of the ridges and steepening their sides, while maintaining the pitch constant, as set forth.

3. The herein-described process of making by a series of separate and independent rolling operations a steam-boiler furnace of the kind having hollow strengthening-ridges, consisting in forming, by a rolling operation, the wall of a tube with outwardly-projecting ridges and inwardly-projecting valleys of considerable depth and then, by a subsequent rolling operation, reducing their depth and imparting to the tube-wall the desired formation, the pitch of the ridges being maintained constant, as set forth.

4. The herein-described process of making by a series of separate and independent rolling operations a steam-boiler furnace of the kind having hollow strengthening-ridges, consisting in evenly stretching the wall of a tube by a first rolling operation and forming outwardly-projecting ridges and inwardly-projecting valleys of considerable depth therein and then by a subsequent rolling operation reducing their depth and imparting to the tube-wall the desired formation, the pitch of the ridges being maintained constant, as set forth.

5. The herein-described process of making a steam-boiler furnace of the kind having hollow strengthening-ridges consisting in evenly stretching the wall of a tube by rolling therein outwardly-projecting ridges and inwardly-projecting valleys, then by rolling increasing the depth of the ridges and steepening their sides, and then by rolling reducing their depth and imparting to the tube-wall the desired formation, as set forth.

6. The herein-described process of making a steam-boiler furnace of the kind having hollow strengthening-ridges consisting in evenly stretching the wall of a tube by rolling therein outwardly-projecting ridges and inwardly-projecting valleys, then by rolling increasing the depth of the ridges and steepening their sides, and then by rolling reducing their depth and imparting to the tube-wall the desired formation, the pitch of the ridges being maintained constant, as set forth.

7. The herein-described process of making by a series of separate and independent rolling operations a steam-boiler furnace of the kind having hollow strengthening-ridges, with thickened end, consisting in selecting a tube whose wall is of the thickness it is desired the end of the furnace shall have and stretching and thinning the other portion of the wall by a first rolling operation and forming outwardly-projecting ridges and inwardly-projecting valleys therein and then by a second rolling operation simultaneously increasing the depth of the ridges and steepening their sides, as set forth.

Signed at Leeds, county of York, England, this 25th day of January, 1904.

ERNEST GEARING.
WILLIAM RAINFORTH.

Witnesses:
WILLIAM JOHNSTON,
HARRY SIDNEY HEPWORTH.